(12) United States Patent
Büdi (10) Patent No.: US 7,318,702 B2
(45) Date of Patent: Jan. 15, 2008

(54) RIVER TURBINE

(76) Inventor: Joseph Benedek Büdi, 100 Lakeshore East, Suite 604, Oakville, Ontario (CA) L6J 6M9

( * ) Notice: Subject to any disclaimer, the term of this patent is extended or adjusted under 35 U.S.C. 154(b) by 391 days.

(21) Appl. No.: 11/150,028

(22) Filed: Jun. 10, 2005

(65) Prior Publication Data

US 2006/0280605 A1    Dec. 14, 2006

(51) Int. Cl.
*F03B 17/06*    (2006.01)
(52) U.S. Cl. .................... 416/142; 415/4.2; 415/64
(58) Field of Classification Search .............. 416/84, 416/117, 142, 136; 415/64, 130, 140, 4.2
See application file for complete search history.

(56) References Cited

U.S. PATENT DOCUMENTS

| | | | |
|---|---|---|---|
| 52,082 A | 1/1866 | Sears | |
| 692,364 A | 2/1902 | Russell | |
| 951,616 A | 3/1910 | Lemert | |
| 1,148,989 A | 8/1915 | Reese | |
| 1,447,686 A | 3/1923 | Oswald | |
| 1,562,506 A * | 11/1925 | Jenkins | 415/125 |
| 1,915,689 A * | 6/1933 | Moore | 416/117 |
| 1,963,196 A * | 6/1934 | Frisch | 416/44 |
| 3,928,771 A | 12/1975 | Straumsnes | |
| 4,045,148 A | 8/1977 | Morin | |
| 4,822,239 A | 4/1989 | Tsipov | |
| 5,570,997 A * | 11/1996 | Pratt | 416/117 |
| 7,198,460 B2 * | 4/2007 | Holt | 415/140 |

* cited by examiner

*Primary Examiner*—Igor Kershteyn
(74) *Attorney, Agent, or Firm*—Young Basile Hanlon MacFarlane & Helmholdt, PC (57) ABSTRACT

A water wheel assembly is disclosed and comprises a water wheel including a plate having a rotation axis and a plurality of circumferentially-spaced receivers, each including a first slit defined through the plate, proximal to the axis, and a second slit defined through the plate, distal to the axis. A vane is provided for each receiver and includes: a body hinged to the plate for movement between a lowered position, flush therewith, and a raised position, angularly extending therefrom; and a pair of flaps extending from the body to: project through respective slits and beyond the plate when the body is lowered; and define, in combination with the body and the plate, a scoop, when the body is raised. The plate is mounted in a flow of water with its axis normal thereto and such that the plate is free to rotate about the axis.

17 Claims, 9 Drawing Sheets

RIVER TURBINE

FIELD OF THE INVENTION

The present invention relates to the field of river turbines.

BACKGROUND OF THE INVENTION

It is well known that to attempt to capture the energy associated with flowing water, such as river currents or ocean tides, through the use of rotating members provided with vanes or paddles, great success in terms of efficiency can be achieved. For example, the hydroelectric complex at Niagara Falls is known to produce relatively low cost power in abundance. However, known high-efficiency applications generally demand that the flow of water be confined and caused to traverse through a sluice into a turbine, with deleterious impacts on the natural environment. Less environmentally-damaging mechanisms, such as river turbines, wherein the flow is not confined, have heretofore typically suffered from relatively poor efficiency.

SUMMARY OF THE INVENTION

A water wheel assembly for use with a flow of water is disclosed. The water wheel assembly comprises a water wheel which includes a wheel plate, a plurality of vanes and a mount means. The wheel plate has a central rotation axis and a plurality of circumferentially-spaced vane-receivers. Each vane-receiver includes a first slit defined through the wheel plate, relatively proximal to the axis, and a second slit defined through the wheel plate, relatively distal to the axis. Of the plurality of vanes, one vane is provided for each vane-receiver. The vane includes a vane body and a pair of flaps. The vane body is hingedly connected to the wheel plate to permit movement of said vane body between a lowered position, whereat it lies flush with the wheel plate, and a raised position, whereat it extends from the wheel plate in angular relation. The pair of flaps extend from the vane body so as to project through respective slits and beyond the wheel plate when the vane body is disposed at the lowered position, and so as to define, in combination with the vane body and the wheel plate, a scoop, when the vane body is disposed at the raised position. The mount means is for holding the wheel plate, in use, in said flow of water such that the rotation axis is orientated normal to said flow and such that the wheel plate is free to rotate about the axis. The water wheel assembly has relatively high efficiency, in terms of its ability to extract power from the flow, notwithstanding that its operation does not demand that the flow of water be confined and caused to traverse through a sluice into a turbine.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, which drawings are briefly described hereinbelow.

DETAILED DESCRIPTION

Figure 1:
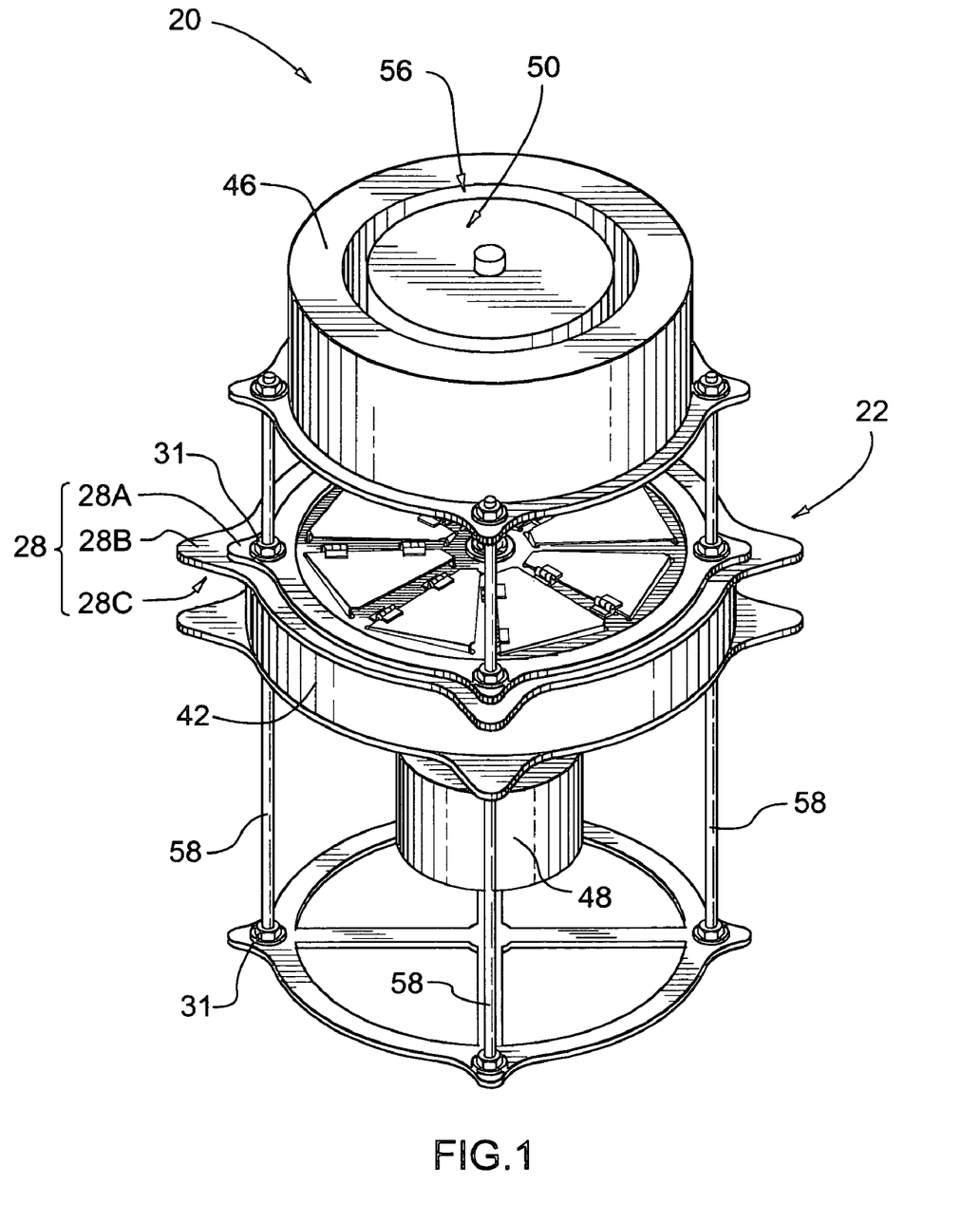
FIG. 1 is a perspective view of a water wheel assembly constructed according to the preferred embodiment of the invention.
Figure 5A:
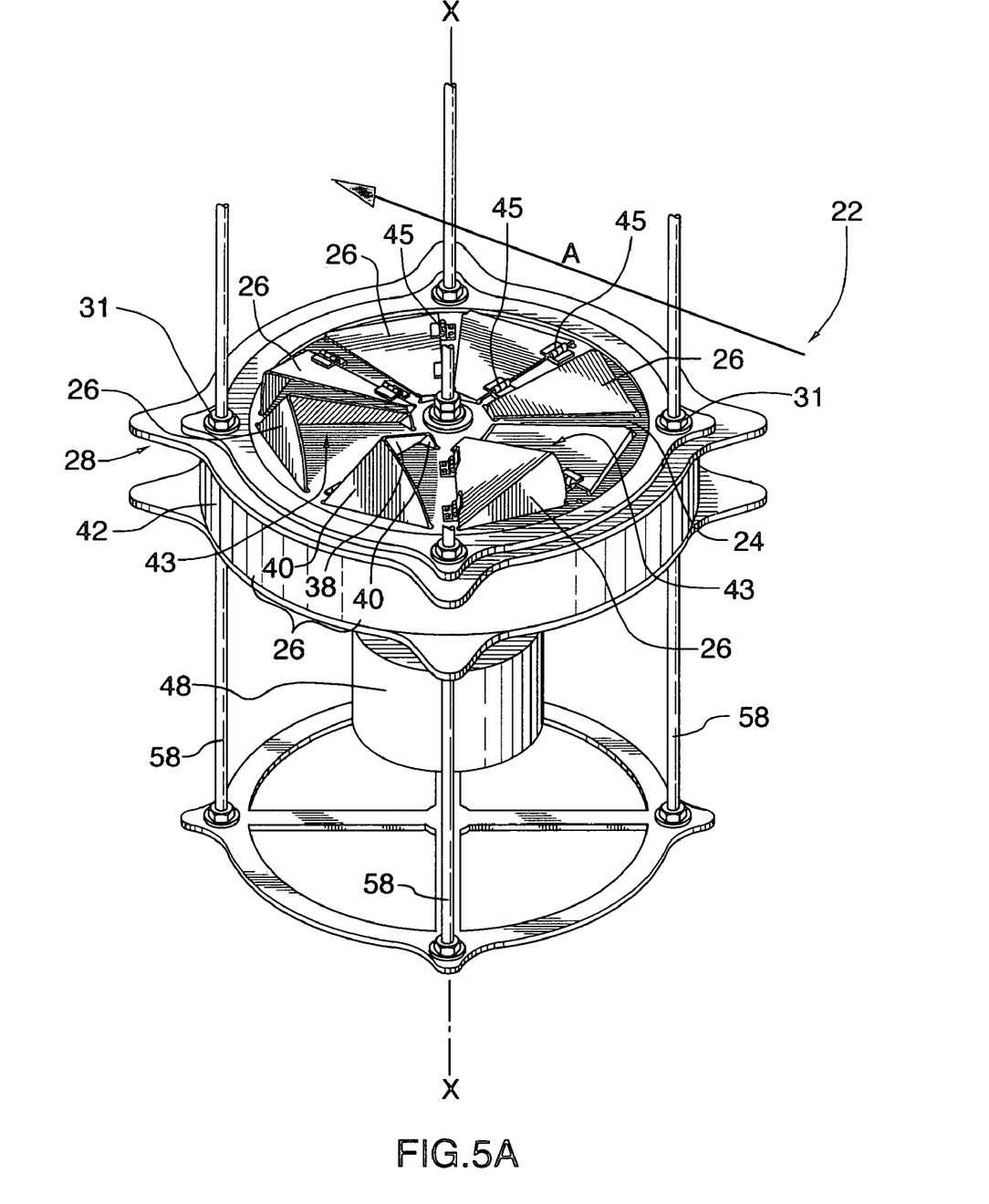
FIG. 5A is a partial perspective view of the structure of FIG. 4.

With general reference to FIG. 1, a preferred embodiment of the present invention, a water wheel assembly, is illustrated, and is designated by the general reference numeral 20. The water wheel assembly comprises a water wheel 22 which will firstly be described in isolation, and will thereafter be described as part of the preferred water wheel assembly 20. With reference to FIG. 1 and FIG. 5A, the water wheel 22 will be seen to include a wheel plate 24, a plurality of triangularly-shaped vanes 26 and mount means 28.

Figure 3:
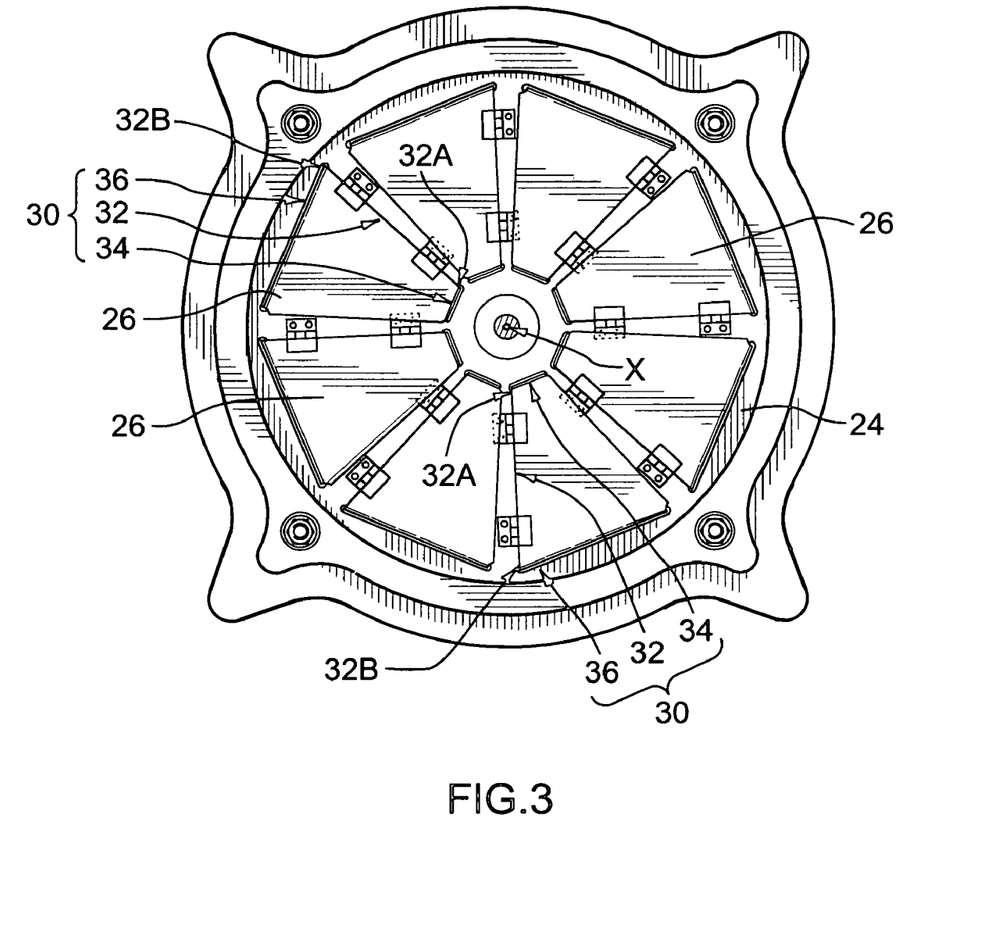
FIG. 3 is a view along section 3-3 of FIG. 2.

The wheel plate 24 has a central rotation axis X-X and a plurality of circumferentially-spaced vane-receivers 30, the latter shown in FIG. 3. Each vane-receiver 30 notionally defines a radially-extending junction line 32 and includes first slit 34 and second slit 36. The junction line 32 has a first end 32A, disposed relatively proximal to the axis X-X, and a second end 32B, disposed relatively distal to the axis X-X. The first slit 34 is defined through the wheel plate 24 and extends, substantially tangentially with respect to the rotation axis X-X, from the first end 32A. The second slit 36 is defined through the wheel plate 24 and extends, substantially tangentially with respect to the rotation axis X-X, from the second end 32B.

For greater clarity, it should be understood that in the present disclosure and appended claims, the phrase "tangential with respect to the rotation axis" means an orientation that is tangential to a circle that is centred about and orientated normal to the rotational axis.

Figure 5B:
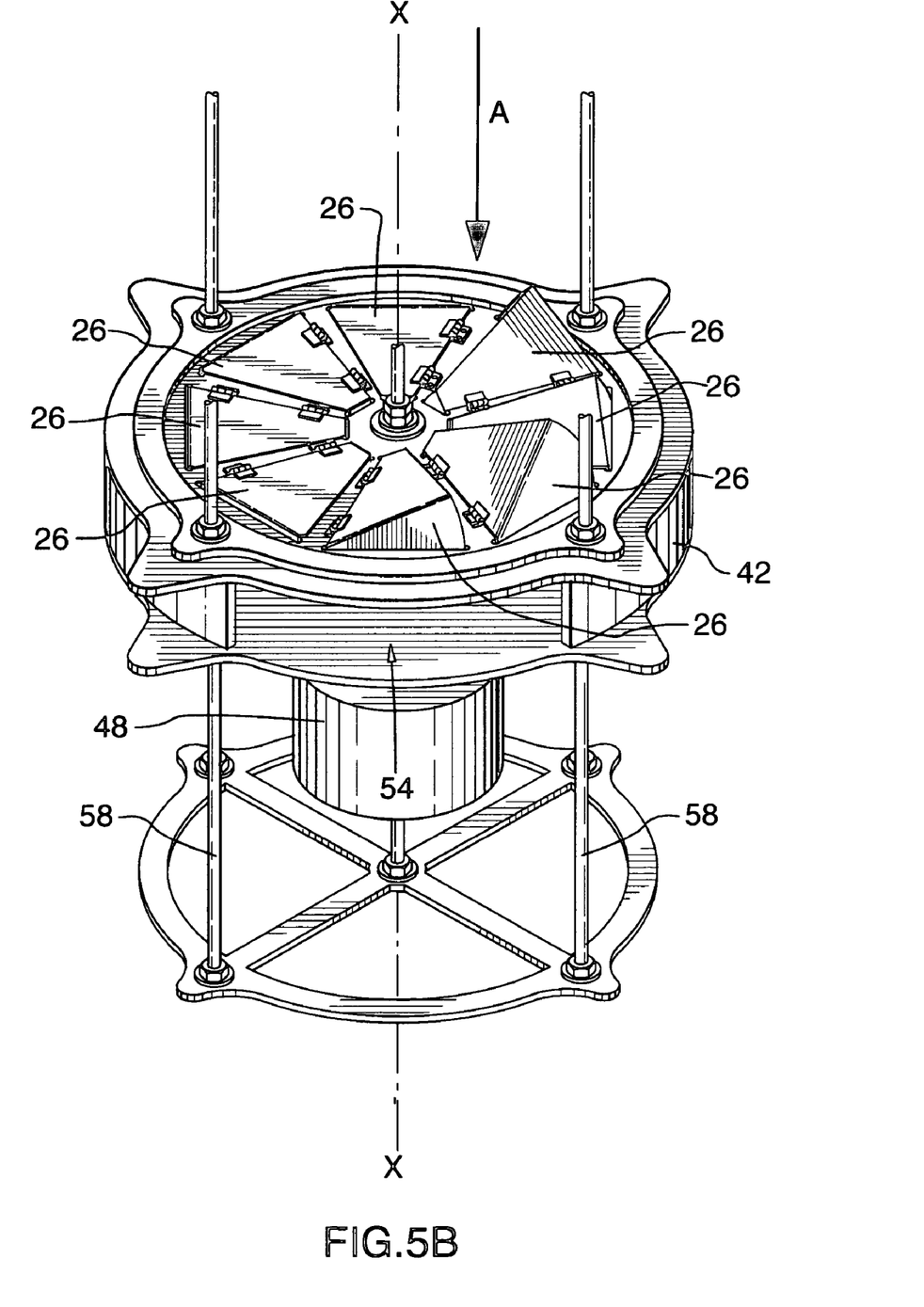
FIG. 5B is a partial perspective view of the structure of FIG. 4, facing upstream.
Figure 5C:
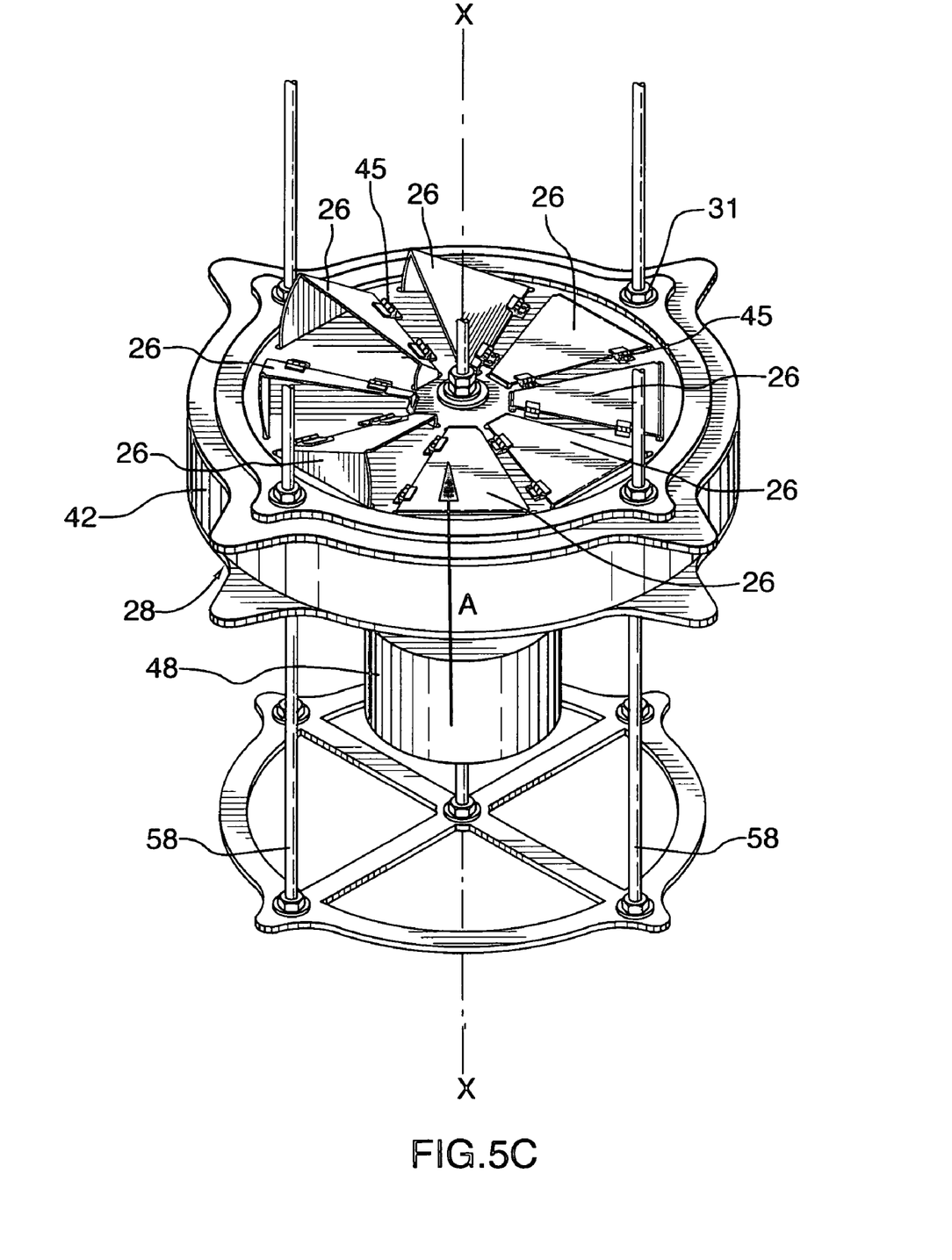
FIG. 5C is a view similar to FIG. 4, facing downstream.
Figure 7:
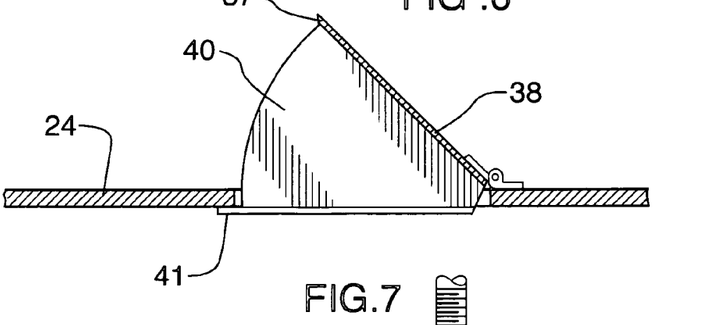
FIG. 7 is a view along section 7-7 of FIG. 6.

Of the plurality of vanes 26, one vane 26 is provided for each vane-receiver 30. As indicated in FIG. 5A and 5B, each vane includes a vane body 38 and a pair of flaps 40. As indicated in FIG. 7 and 5A, the vane body 38 has a 45° bevelled or sloped leading edge 37 and is hingedly connected to the wheel plate 24 by conventional hinges 45 to permit movement of said vane body 38 between a lowered position, whereat it lies flush with the wheel plate 24, and a raised position, whereat it extends from the wheel plate 24 in angular relation. For clarity, it should be understood that in FIG. 5A, four of the vane bodies 38, towards the lower, left side of the page, are shown at or near their respective raised positions, and four of the vane bodies 38, towards the upper, right side of the page, are shown at or near their respective lowered positions. The pair of flaps 40 extend from the vane body 38 so as to project through respective slits 34,36 and beyond the wheel plate 24 when the vane body 38 is disposed at the lowered position, and so as to define, in combination with the vane body 38 and the wheel plate 24, a scoop 43, when the vane body 38 is disposed at its raised position. As shown in FIG. 7, a lip 41, formed on the side of the flap 40 disposed in outer slit 32, arrests movement of the vane body 38 beyond the raised position.

Figure 2:
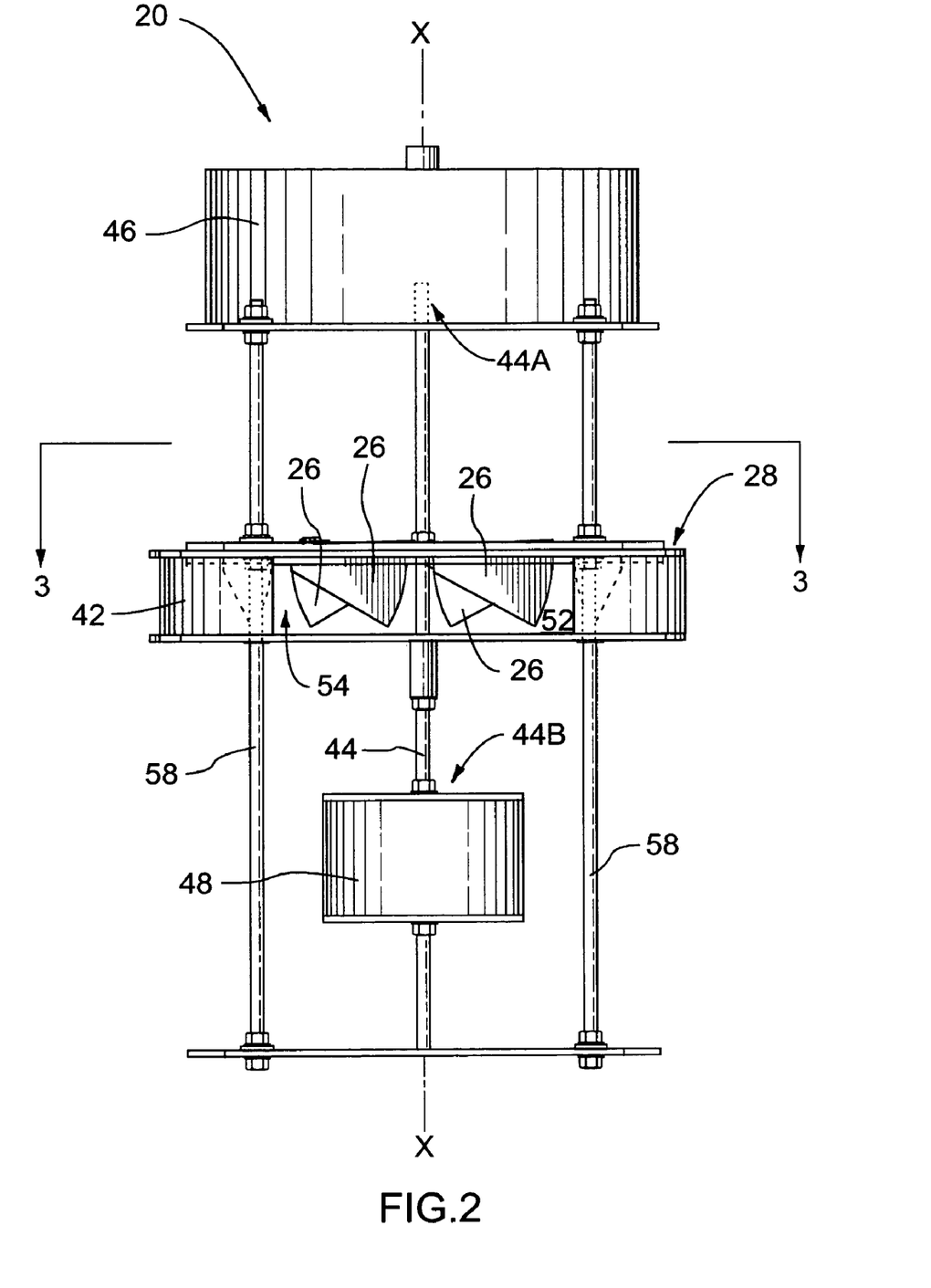
FIG. 2 is a side elevational view of the structure of FIG. 1.
Figure 6:
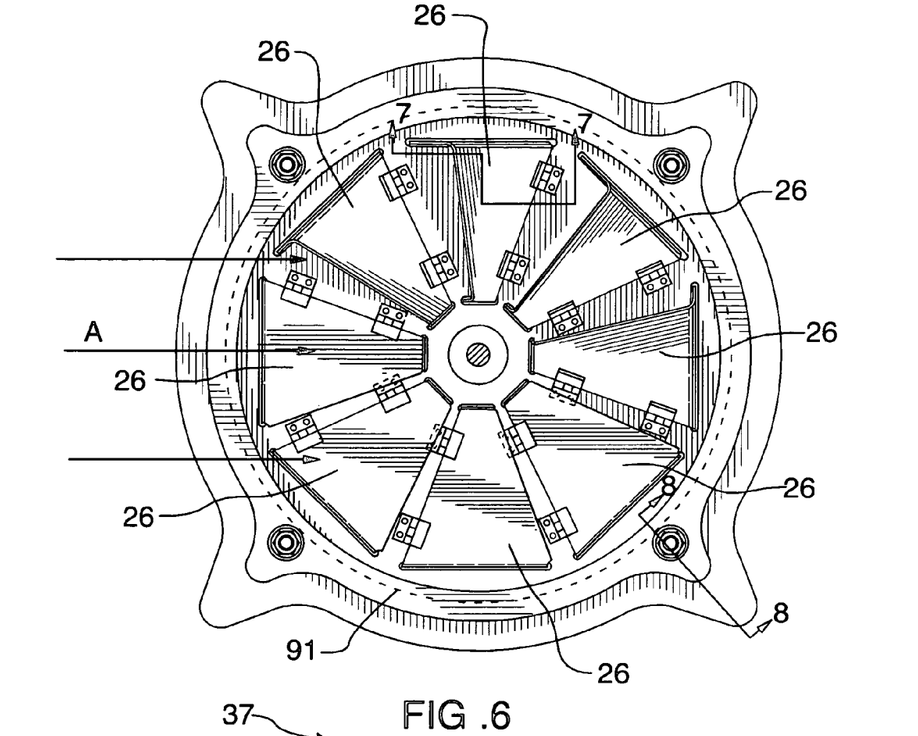
FIG. 6 is a view along section 6-6 of FIG. 4.
Figure 8:
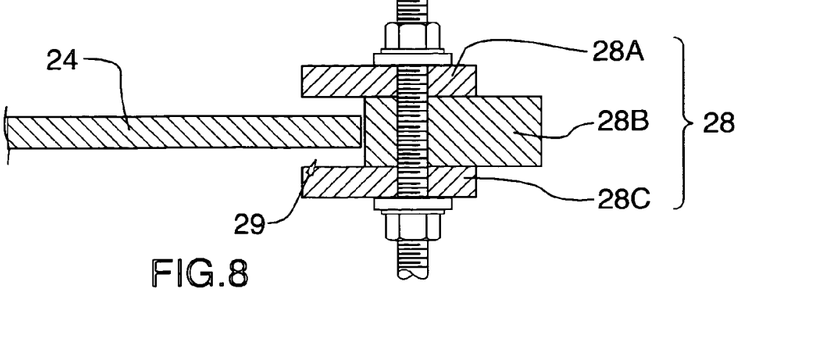
FIG. 8 is a view along section 8-8 of FIG. 6.

The mount means 28 illustrated takes the form of an annular mounting bracket in which the wheel plate 24 is rotatably mounted such that the flaps 40 project therethrough when disposed in their respective lowered positions, as shown in FIG. 2. The mounting bracket 28 comprises an upper annular plate 28A, an intermediate annular plate 28B and a lower annular plate 28C, which are stacked against one another to define an annular channel 29 which receives the periphery 91 of the wheel plate 24 in spaced relation, as best seen in FIG. 8. Such spacing permits the wheel plate 24 to rotate with respect to the bracket 28 in substantially frictionless relation. The periphery 91 is shown in dotted outline in FIG. 6, for clarity.

In use, as shown in FIG. 5A, the mounting bracket 28 is orientated in a flow of water A, such as a river, such that the rotation axis X-X is orientated normal to said flow A. So orientated, flow A will pass around water wheel 22. As the flow A passes over the water wheel 22, the vane bodies 38 will be forced into their lowered or raised positions, depending upon their orientation with respect to the flow A. To clarify, where the hinged edge of a vane body 38 presents towards the flow A, the body 38 will be forced to its lowered position, and where the hinged edge presents downstream from the flow A, the body 38 will be forced to its raised position, whereat it defines scoop 43. Scoops 43, in turn, receive the force of the flow A, and transmit same to the wheel plate 24, causing rotation, and subsequent continuous reconfiguration of the vane bodies 38, resulting from the orientations with respect to the flow A they assume during such rotation.

The water wheel 22 is advantageously incorporated in a water wheel assembly 20, as shown in FIGS. 1 and 2, which assembly includes, in addition to the water wheel 22, a shroud means 42, a shaft 44, a primary buoy 46, a secondary buoy 48 and an electrical generator 50.

The shroud means 42 takes the form of a bowl member connected to the mounting bracket 28 to define in combination therewith a cavity 52 surrounding the flaps 40 and accessible through an aperture 54, also shown in FIG. 2. The shroud means 42 is for shielding the flaps 40, when they project through the wheel plate 24 in use, from the force of said flow A, thereby to improve the ability of the wheel 22 to extract power from the flow A. The shroud means 42 also helps to shield the water wheel 22 from dirt and debris, which could foul its operation and damage the vanes 26.

The primary buoy 46 is annular, so as to define interior chamber 56 shown in FIG. 1, is mounted to bracket 28 by a plurality of rods 58, and is adapted to suspend the water wheel assembly 20 with the vane bodies 38 disposed atop the wheel plate 24 such that, in use, the flow of water A applies a downward force to the wheel plate 24 and such that the water wheel 22 is supported in a stable position in the flow A.

The rods 58 also serve as the medium for connecting the upper, intermediate and lower plates 28A,28B,28C; the rods 58 extend therethough, and nuts 31 are threaded on opposite sides thereof, to snug the plates 28A,28B,28C tightly against one another.

The shaft 44 extends through the wheel plate 24 for rotation therewith and has a first end 44A terminating in the chamber 52 and a second end 44B terminating beyond the bowl member 42.

The generator 50 is mounted in the chamber 56 to the first end 44A of the shaft 44, to produce electrical power upon rotation of the shaft 44.

The secondary buoy 48 is mounted to the shaft 44, beneath the shroud means 42, to counterbalance the downward force applied by the flow A to the wheel plate 24.

Figure 4:
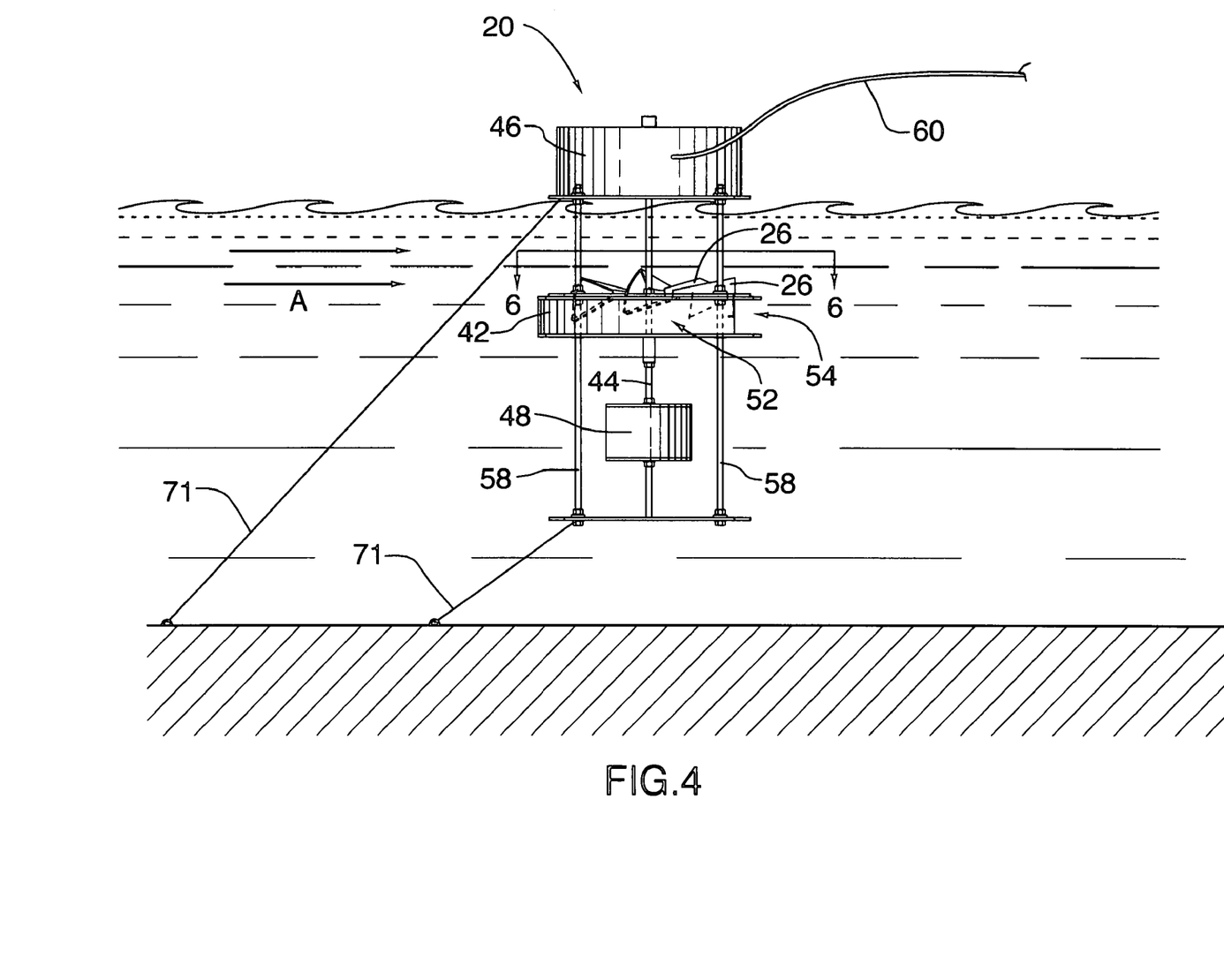
FIG. 4 is a side view of the structure of FIG. 1 in a first mode of use.

In a first mode of use, shown in FIG. 4, the water wheel assembly 20 is tethered by a cable 71 to a river bottom, to produce electricity which is delivered to shore by a power line 60.

Figure 9:
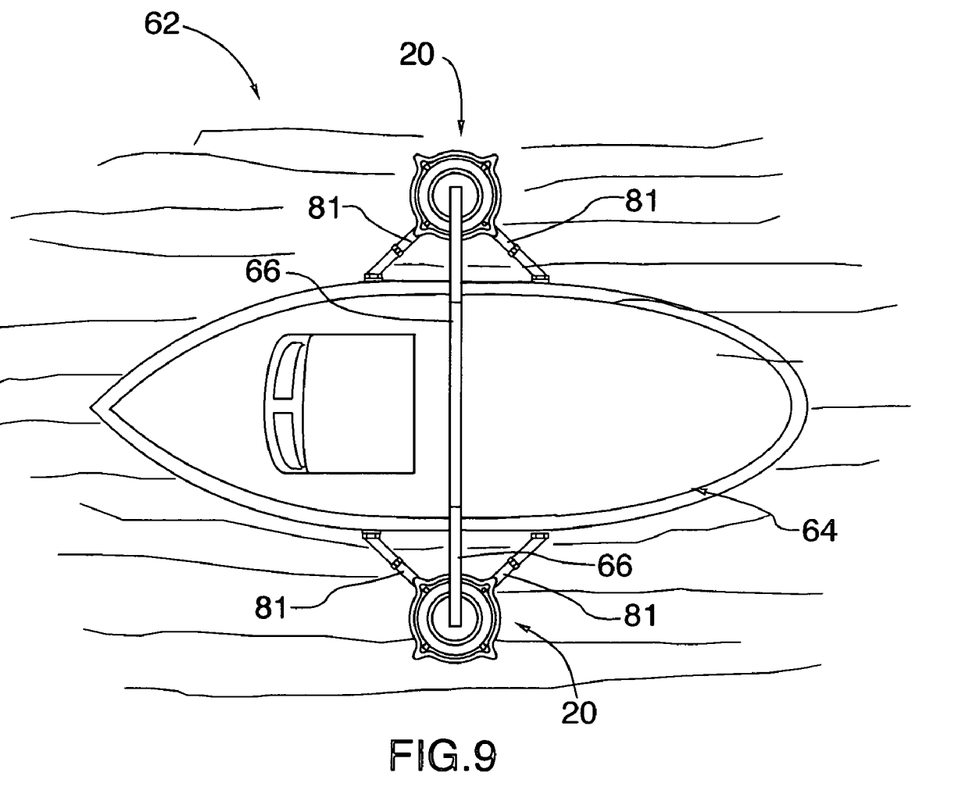
FIG. 9 is a plan view of a pair of the water wheel assemblies of FIG. 1, in a second mode of use.
Figure 10:
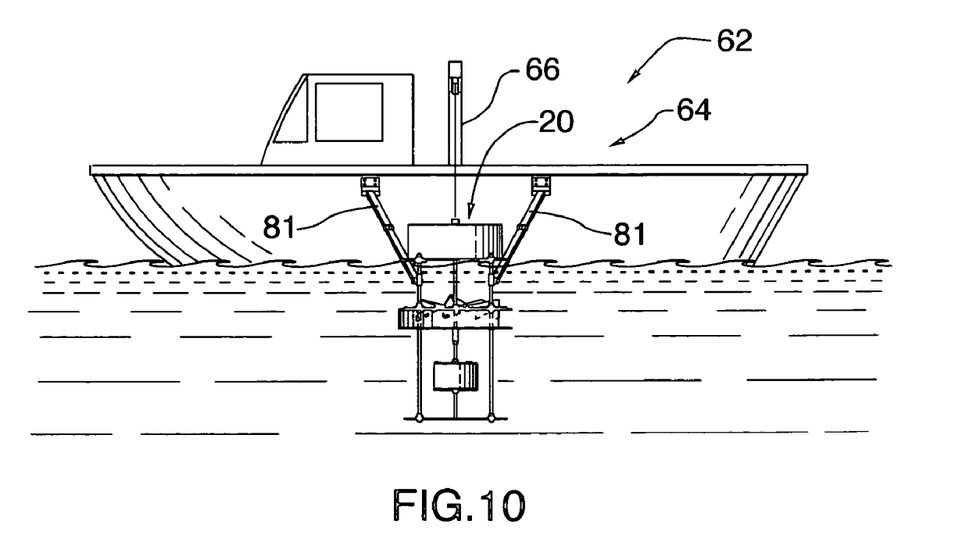
FIG. 10 is a side elevational view of the structure of FIG. 9.

In a second mode of use, shown in FIGS. 9,10, a pair of water wheel assemblies 20 are used in a mobile power generation system 62. The system comprises a boat 64 having cranes 66 extending from the port and starboard sides, and the pair of water wheel assemblies 20, which are suspended from the cranes 66 and further secured by two jointed stabilizing arms 81 hingedly attached to the side of the boat 64 ensuring steady, controlled operation. The stabilizing arms 81 prevent rotation of the assemblies 20 and ensure same are disposed in the flow A. The power produced by the water wheel assemblies 20 is stored in batteries (not shown) aboard the vessel for subsequent use.

While but a single preferred embodiment of the present invention has been herein shown and described, and while but two uses have been described, various changes can be made.

For example, whereas the junction lines of the preferred embodiment extend radially, so as to intersect the rotation axis, this need not be the case; the lines could easily set somewhat askew, so as to bypass the rotation axis.

Further, whereas the first and second slits extend substantially tangentially with respect to the axis, this need not be the case. The slits could, for example, extend normally from the junction lines, in which case, a rectangular vane body could be utilized.

As well, whereas eight vanes are shown in the preferred embodiment illustrated, it will be readily appreciated that more or fewer vanes could easily be accommodated.

Additionally, whereas shroud means are provided for shielding the flaps from the force of the flow, this could be omitted.

Yet further, whereas in the preferred embodiment, a primary buoy is utilized to suspend the water wheel assembly in the water, such that even in rough water conditions, the generator is not swamped, it will be evident that the primary buoy is not necessary. For example, it could easily be omitted in the use shown in FIG. 9.

Moreover, whereas a secondary buoy is utilized, as a force counterbalance, it is conceivable that this could be omitted, if the mount means and wheel plate were made sufficiently robust.

However, it should be understood that, whereas variances from the illustrated embodiment are within the contemplation of the inventor, the illustrated embodiment is preferred, and variance therefrom may have adverse consequences in terms of efficiency and manufacturing cost.

Lastly, whereas the preferred embodiment is shown in two specific uses, other uses are envisioned. The water wheel could, for example, be suspended in a river flow by a shore-mounted boom, or attached permanently to a dock or pier, or fixed to a river bottom.

Yet other uses and modifications are possible. Accordingly, the scope of the invention is to be limited only by the claims appended hereto, purposively construed.

What is claimed is:

1. A water wheel assembly for use with a flow of water, said water wheel assembly comprising:

a water wheel including:
- a wheel plate having a central rotation axis and a plurality of circumferentially-spaced vane-receivers, each vane-receiver including a first slit defined through the wheel plate, relatively proximal to the axis, and a second slit defined through the wheel plate, relatively distal to the axis,
- a plurality of vanes provided one vane for each vane-receiver, said vane including: a vane body hingedly connected to the wheel plate to permit movement of said vane body between a lowered position, whereat it lies flush with the wheel plate, and a raised position, whereat it extends from the wheel plate in angular relation; and a pair of flaps extending from the vane body so as to project through respective slits and beyond the wheel plate when the vane body is disposed at the lowered position, and so as to define, in combination with the vane body and the wheel plate, a scoop, when the vane body is disposed at the raised position, and
- mount means for holding the wheel plate, in use, in said flow of water such that the rotation axis is orientated normal to said flow and such that the wheel plate is free to rotate about the axis.

2. A water wheel assembly according to claim 1, wherein each vane-receiver notionally defines a radially-extending junction line having a first end, disposed relatively proximal to the axis, from which the first slit extends and a second end, disposed relatively distal to the axis, from which the second slit extends.

3. A water wheel assembly according to claim 1, wherein the first slit of each vane-receiver is orientated substantially tangentially with respect to the rotation axis.

4. A water wheel assembly according to claim 1, wherein the second slit of each vane-receiver is orientated substantially tangentially with respect to the rotation axis.

5. A water wheel assembly according to claim 1, further comprising a shaft extending through the wheel plate for rotation therewith and a generator mounted to the shaft to produce power upon rotation of the shaft.

6. A water wheel assembly according to claim 1, wherein, in use, the water wheel is disposed with the vane bodies disposed atop the wheel plate such that the flow of water applies a downward force to the wheel plate, and further comprising a secondary buoy operatively mounted to the wheel plate to counterbalance the downward force applied by the flow of water.

7. A water wheel assembly according to claim 1, wherein the mount means comprises an annular mounting bracket to which the wheel plate is rotatably mounted such that the flaps project therethrough when the vane bodies are disposed in their respective lowered positions.

8. A water wheel assembly according to claim 7, wherein the annular mounting bracket comprises an upper annular plate, an intermediate annular plate and a lower annular plate, which are stacked against one another to define an annular channel which receives the periphery of the wheel plate in spaced relation.

9. A water wheel assembly according to claim 7, further comprising shroud means for shielding the flaps, when they project through the wheel plate in use, from the force of said flow.

10. A water wheel assembly according to claim 9, wherein the shroud means comprises a bowl member connected to the mounting plate to define in combination therewith a cavity surrounding the flaps.

11. A water wheel assembly according to claim 10, wherein the bowl member is releasably connected to the mounting plate.

12. A water wheel assembly according to claim 10, wherein the bowl member defines an aperture in fluid communication with the water flow and oriented in the downstream direction in use.

13. A water wheel assembly according to claim 1, further comprising a primary buoy adapted to operatively suspend the water wheel assembly in the flow of water in use.

14. A water wheel assembly according to claim 13, further comprising a shaft extending through the wheel plate for rotation therewith and a generator mounted to the shaft to produce power upon rotation of the shaft.

15. A water wheel assembly according to claim 14, wherein the primary buoy is annular to define a central chamber and the generator is mounted in said central chamber.

16. A water wheel assembly according to claim 15, adapted to be tethered to a river bottom.

17. A power generation system comprising:
- a boat having cranes extending from the port and starboard sides;
- a water wheel assembly according to any one of claims 1 to 15 for each crane and suspended therefrom; and
- stabilizing arms hingedly attached to the sides of the boat and secured to the water wheel assemblies to prevent rotation of the assemblies and ensure same are submerged when the system is in use.

\* \* \* \* \*